United States Patent [19]
Hershey

[11] 3,863,963
[45] Feb. 4, 1975

[54] CHIP-RETAINING BUSHING FOR THREADED ASSEMBLY
[75] Inventor: Gerald Hershey, Wichita, Kans.
[73] Assignee: The Coleman Company, Inc., Wichita, Kans.
[22] Filed: Oct. 23, 1973
[21] Appl. No.: 408,492

[52] U.S. Cl. .................. 285/334, 85/1 P, 285/355, 285/DIG. 11
[51] Int. Cl. ............................................. F16l 25/00
[58] Field of Search ............ 285/40, 340, 374, 355, 285/380, 333, DIG. 11, 334, 380, 55, 329; 85/1 P, 47; 138/96 R, 96 T; 408/207, 215; 16/2; 15/DIG. 4, 104.05, 104.04, 104.13

[56] References Cited
UNITED STATES PATENTS
| | | | |
|---|---|---|---|
| 3,167,333 | 1/1965 | Holl et al. | 285/333 X |
| 3,192,612 | 7/1965 | Elliott et al. | 285/55 X |
| 3,427,050 | 2/1969 | Krieg | 285/355 |
| 3,596,931 | 8/1971 | Mishler | 285/55 |

Primary Examiner—Dave W. Arola

[57] ABSTRACT

A chip-retaining bushing is adapted for use with an externally threaded tubular male member and an internally threaded female member to retain chips or shavings as the male member is screwed into the female member. The bushing includes a cylindrical end portion which may be frictionally retained in the tubular male member, an intermediate stop portion which extends outwardly from the tubular end portion and engages the end of the male member, and a frusto-conical flexible flange which diverges outwardly and rearwardly from the forward end of the bushing. The outer diameter of the flexible flange is greater than the minor diameter of the threads of the female member, and the flexible flange engages the threads of the female member as the male member is screwed into the female member flange to provide a chip-retaining pocket between the forward end of the male member and the flange portion.

9 Claims, 6 Drawing Figures

PATENTED FEB 4 1975 3,863,963

CHIP-RETAINING BUSHING FOR THREADED ASSEMBLY

BACKGROUND AND SUMMARY

This invention relates to a chip-retaining bushing for use when a tubular male member is threaded into a female member.

When a tubular male member such as an externally threaded pipe is screwed into an internally threaded opening of another member, chips or shavings are frequently produced, particularly if the material of one of the members is softer than the material of the other member. For example, if a steel pipe is screwed into a threaded opening in an aluminum or zinc die casting, the relatively hard threads of the steel pipe can cut chips or shavings from the softer threads of the aluminum or zinc. This is especially likely if the threads are pipe threads, which taper or converge inwardly along the length of the pipe and the female opening. The chips or shavings produced when the pipe is threaded into the female member can interfere with components within the female member or in other portions of the apparatus of which the male and female members are parts.

The invention provides a bushing which is mounted on the end of the pipe which is screwed into the female member and which cooperates with the threads of the female member to form a chip-retaining pocket which retains chips or shavings produced as the pipe is screwed. The chip-retaining bushing includes a flexible frusto-conical flange which engages the threads of the female member as the pipe advances therein, and the flange is spaced forwardly from the forward end of the pipe. A trap or pocket is thereby provided which is defined by the flange, a tubular portion of the bushing, the forward end of the pipe, and a portion of the female threads. The frusto-conical flange flexes and deforms as it advances along the helical female threads, and the flange engages the female threads around substantially the entire circumference thereof to prevent chips from passing forwardly of the flange.

DESCRIPTION OF THE DRAWING

The invention will be explained in conjunction with an iluustrative embodiment shown in the accompanying drawing, in which.

Description of Specific Embodiments

Figure 1:
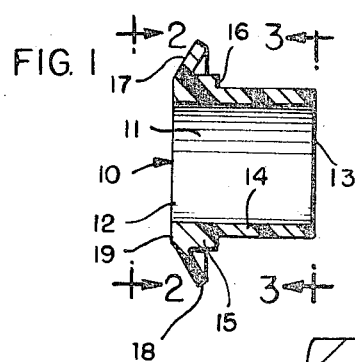
FIG. 1 is a longitudinal sectional view of a chip-retaining bushing formed in accordance with the invention.
Figure 2:
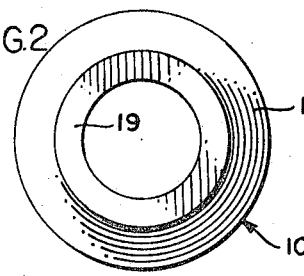
FIG. 2 is a front view of the bushing taken along the line 2—2 of FIG. 1.
Figure 3:
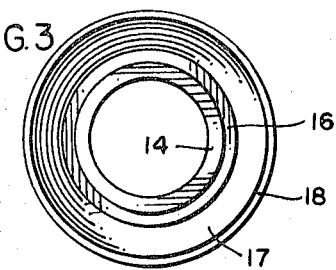
FIG. 3 is a rear view of the bushing taken along the line 3—3 of FIG. 1.

Referring first to FIGS. 1–3, the numeral 10 designates generally a chip-retaining bushing which includes a generally cylindrical body 11 having a forward end 12 and a rearward end 13. The body includes a cylindrical rearward end portion 14 and an intermediate or stop portion 15 which extends radially outwardly from the cylindrical end portion to provide an annular stop shoulder 16. A frusto-conical flange 17 diverges outwardly and rearwardly from the intermediate portion and terminates in an outer edge 18 which is spaced radially outwardly from the outer periphery of the intermediate portion 15 and is spaced slightly axially forwardly of the stop shoulder 16. The forward end 12 of the bushing may include an annular flat face 19.

The frusto-conical flange is formed of flexible material which can flex and deform as it engages the female threads, and the bushing is advantageously integrally molded from a plastic material which will provide the desired flexibility, such as nylon. However, the bushing can be formed of other materials which are compatible with the liquids or gases to which it may be exposed.

Figure 4:
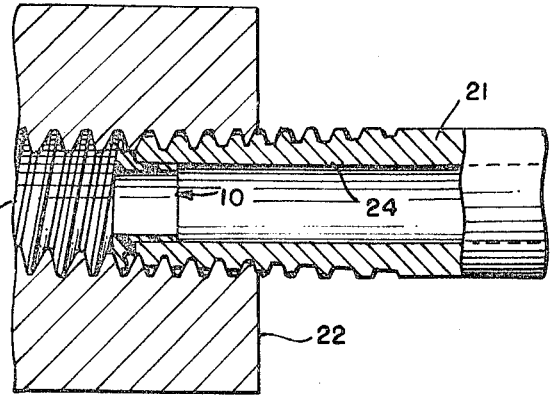
FIG. 4 is a sectional view showing the bushing attached to a pipe which is being threaded into an internally threaded female member.
Figure 5:
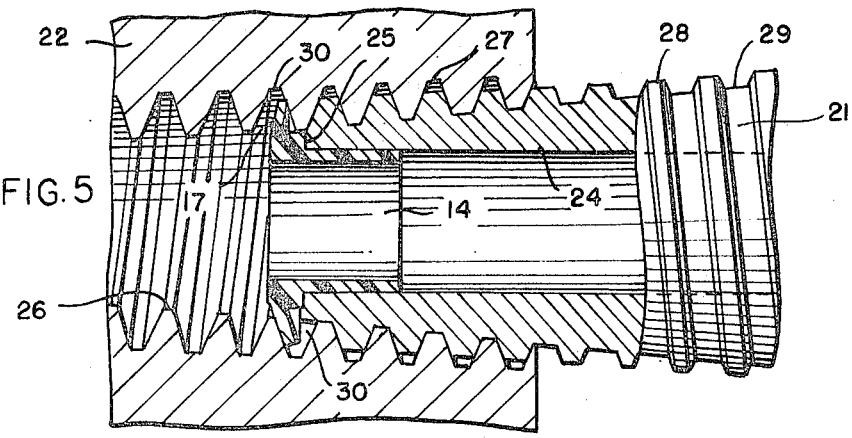
FIG. 5 is an enlargeed view of a portion of FIG. 4.
Figure 6:
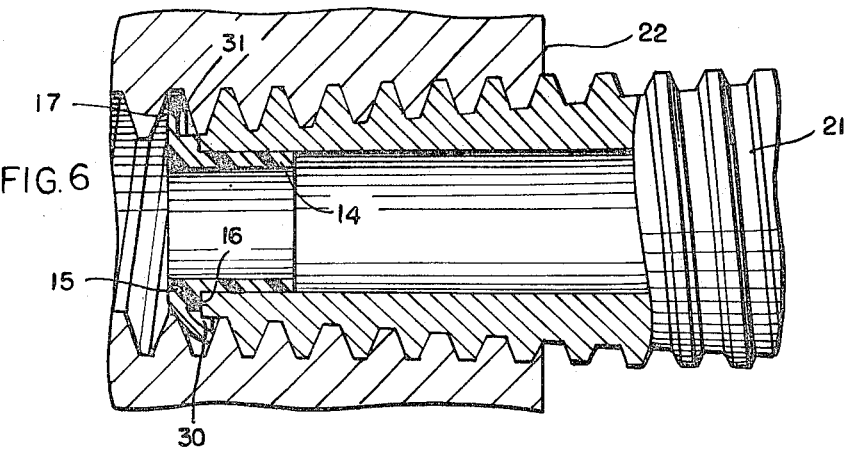
FIG. 6 is a view similar to FIG. 5 showing the pipe being advanced farther into the female member.

The bushing 10 is intended for use with an externally threaded male member or pipe 21 shown in FIGS. 4–6 and a female member 22 which is provided with an internally threaded opening 23. The pipe 21 has a central bore 24, and the outer diameter of the tubular end portion 14 of the bushing is selected so that the end portion can be inserted into the bore of the pipe and be frictionally retained therewith. The bushing is inserted into the pipe until the stop shoulder 16 engages the forward end 25 of the pipe, and the forward end of the frusto-conical flange will thereby be spaced forwardly of the forward end of the pipe. The pipe can then be screwed into the threaded opening of the female member.

The outer periphery of the frusto-conical flange 17 has a diameter greater than the diameter of the minor diameter 26 of the female threads, perhaps, for the first or entering threads of the female member, and the flange therefore engages the female threads as the pipe advances into the threaded opening. The particular threads illustrated in FIGS. 4–6 are standard pipe threads, and the minor diameters 26 and major diameters 27 of the female threads both taper inwardly along the length of the opening. Similarly, the crests 28 and roots 29 of the male thread taper inwardly toward the forward end of the pipe. This taper is exaggerated in the drawing for purposes of illustration.

FIG. 5 illustrates the pipe and the female member before the pipe is screwed fully into the threaded opening, and the crests of the male thread are spaced from the roots of the female thread. The flange 17 engages the female thread around substantially the entire circumference of the flange and a chip-retaining pocket 30 is formed between the flange 17, the intermediate portion 15, the forward end of the pipe 21, and a portion of the female thread. Any chips or shavings which are created as the pipe is screwed into the threaded opening are retained in this pocket. The chips cannot pass forwardly of the flange since the flexible flange engages and is deformed by the female thread as the pipe and bushing advance so that the flange engages the female thread around all or substantially all of its circumference.

As the pipe and the bushing continue to be advanced, the flange may eventually engage a portion of the female thread in which the root diameter of the thread is less than the diameter of the outer periphery of the bushing as illustrated in FIG. 6. However, the bushing can still be advanced relative to the female thread since the flexible flange can be deformed inwardly, and the outer periphery of the flange may even be turned inwardly as at 31 in FIG. 6. The flange continues to form the chip-retaining pocket 30 as the bushing and pipe are threaded into the female member, and when the pipe is tightened within the opening, the bushing will provide a permanent trap for the chips, shavings, and other particles which are created as the pipe is screwed into the female member and will prevent these particles from entering the interior of the female member or the bore of the pipe.

The bushing is intended to remain as a part of the threaded assembly formed by the female member and the male member, but if the male member is withdrawn from the female member, the bushing can be reused.

The bushing can be used when either the material of the male member or the female member is softer than the material of the other member, but generally the material of the female member is softer. For example, steel pipes are frequently screwed into openings in members made of aluminum, zinc, or other relatively soft materials. This could occur, for example, when the pipe stem of a gauge or similar device is screwed into an opening in a casing the internal pressure of which is to be measured or when a connecting pipe is screwed into a casting or other component which is formed of relatively soft material.

In the particular embodiment illustrated the bore 24 of the pipe and the end portion 14 of the bushing are both cylindrical, but the bore of the pipe can have other configurations. For example, if the pipe has a square bore, the tubular end portion 14 can be provided with a similarly shaped square outer surface.

In one specific embodiment of the bushing for use with one-half inch pipe thread, the outer diameter of the cylindrical end portion 14 was 0.587 inch, the outer diameter of the intermediate portion 15 was 0.635 inch, and the diameter of the outer periphery of the flange was 0.750 inch. The flange was 0.015 inch thick, and the frusto-conical surface of the flange extended at an angle of about 70° from the axis of the bushing. The bushing was integrally molded from nylon, and the flange possessed good flexibility and resilience.

While in the foregoing specification a detailed description of a specific embodiment of the invention was set forth for the purpose of illustration, it is to be understood that many of the details herein given may be varied considerably by those skilled in the art without departing from the spirit and scope of the invention.

I claim:

1. A chip-retaining bushing adapted for use with an externally threaded tubular male member and an internally threaded female member, the bushing comprising a tubular body having a tubular rear end portion adapted to be inserted into the tubular male member, a stop portion extending transversely outwardly from the body forwardly of the tubular end portion and adapted to engage the end of the tubular male member, and a flexible frusto-conical flange portion diverging outwardly and rearwardly from the body forwardly of the stop portion, the flexible flange portion having a generally circular outer periphery having a diameter greater than the minimum diameter of the threads of the female member whereby a chip-retaining space is provided between the end of the male member and the flange portion when the stop portion engages the end of the tubular male member.

2. The bushing of claim 1 in which the bushing is integrally molded from plastic.

3. The bushing of claim 1 in which the bushing is integrally molded from nylon.

4. The bushing of claim 1 in which the flange diverges rearwardly at an angle of about 70° to the axis of the tubular body.

5. The bushing of claim 1 in which the stop portion is generally cylindrical and extends axially forwardly from said end portion to the flange portion.

6. In combination, an internally threaded female member, an externally threaded tubular male member threadedly engaged with the female member, the male member having a cylindrical central bore, and a bushing mounted on the male member, the bushing including a cylindrical rear end portion frictionally retained in the bore of the male member, a radially enlarged intermediate portion extending outwardly from the cylindrical end portion to provide an annular stop shoulder engaging the end of the male member, and a frusto-conical flexible and resilient flange portion extending outwardly from the forward end of the bushing and rearwardly toward the cylindrical rear end portion, the diameter of the outer periphery of the flange portion being greater than the minor diameter of at least some of the threads of the female member, the flange engaging the threads of the female member as the male member is threaded into the female member, the forward end of the flange portion being spaced forwardly from the stop shoulder whereby a chip-retaining pocket is formed between the forward end of the male member and the flange portion.

7. The structure of claim 6 in which the bushing is integrally molded from plastic.

8. The structure of claim 6 in which the flange extends at an angle of about 70° to the axis of the tubular body.

9. The structure of claim 6 in which the threads of the male and female members are pipe threads.

* * * * *